G. W. Prout,
Hay Elevator,
Nº 41,640. Patented Feb. 16, 1864.
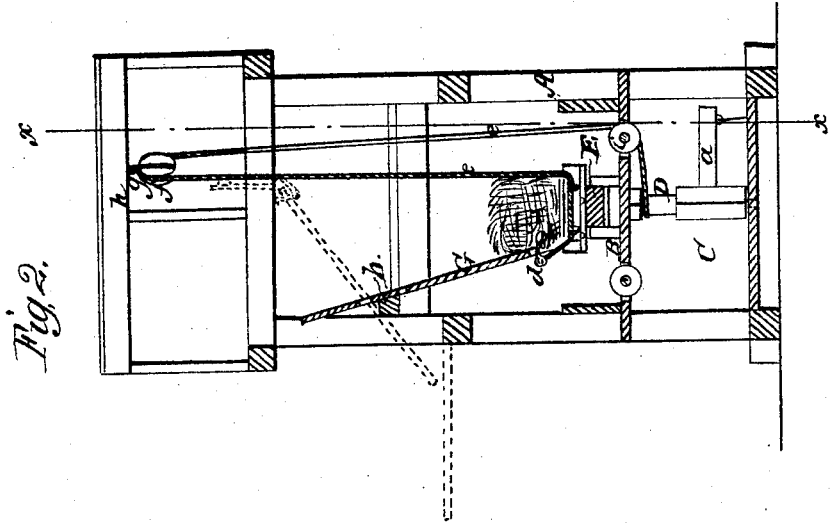
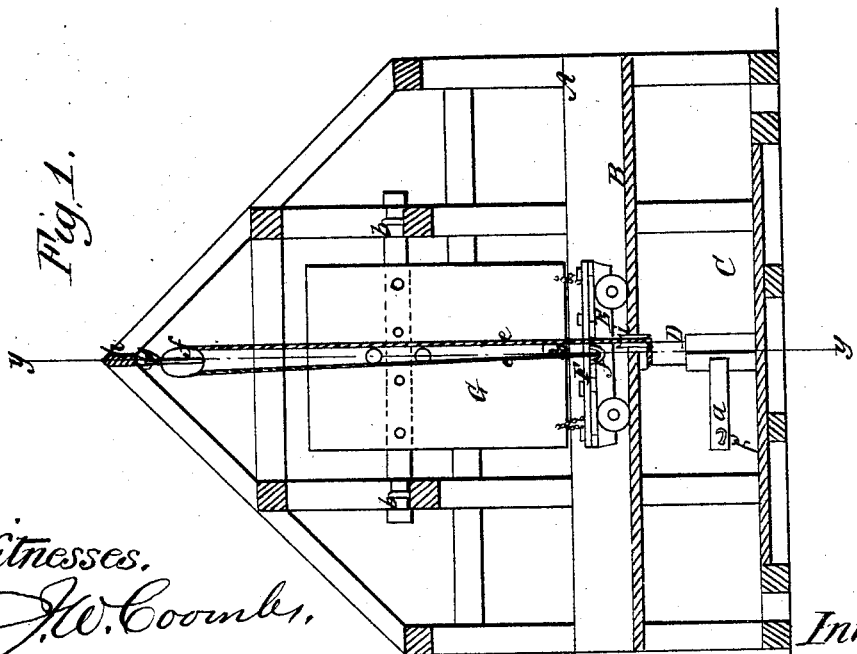
Witnesses.
J. W. Coombs,
Geo. W. Reed.
Inventor
G. W. Prout
per Munn & Co

UNITED STATES PATENT OFFICE.

G. W. PROUT, ASHLAND, NEW YORK.

IMPROVEMENT IN APPARATUS FOR ELEVATING HAY, &c.

Specification forming part of Letters Patent No. 41,640, dated February 16, 1864.

*To all whom it may concern:*

Be it known that I, G. W. PROUT, of Ashland, in the county of Greene and State of New York, have invented a new and Improved Apparatus for Elevating Hay, &c.; and I do hereby declare that the following is a full, clear, and exact description of the same, reference being had to the accompanying drawings, forming a part of this specification, in which—

Figure 1 represents a longitudinal vertical section of my invention, the line *x x*, Fig. 2, indicating the plane of section. Fig. 2 is a transverse vertical section of the same, the plane of section being indicated by the line *y y*, Fig. 1.

Similar letters of reference in both views indicate corresponding parts.

The object of this invention is to elevate a load of hay or any other load bodily from a wagon or car to a place above, and dump it at the required spot in an easy, simple, and quick manner.

The invention consists in the application or use of a tilting platform in combination with a frame or box placed under the load to be elevated, and with a suitable hoisting rope and tackle in such a manner that by drawing the hoisting-rope through under the frame and load, connecting it with the tilting platform, and attaching it to a suitable capstan or windlass, the whole load can be bodily lifted off from the wagon or cart and dumped in a loft or other spot above, with comparatively little power and with little loss of time.

To enable those skilled in the art to make and use my invention, I will proceed to describe it.

A represents a barn, built up of timber or any other suitable material. The ground floor B of this barn is supposed to be sufficiently elevated, or built with a souterran or basement, C, to afford room for the erection of a capstan or windlass, D, underneath. At the same time said ground floor ought to be so situated that a wagon or other vehicle, E, loaded with hay or any other material, can be conveniently driven on it, and the capstan is provided with a sweep, *a*, so that it can be operated by a horse.

The wagon or vehicle E is provided with a movable frame, F, which is placed on the platform of the wagon before the load is put on, so that, after the load has been put on, by raising said frame the whole load has to be raised also.

G is a platform, which is provided with trunnions *b*, that rest upon beams *c* above the level of the loft to which the hay is to be elevated. The lower edge of said platform extends down to a level with the frame F on the wagon E, and it is provided with a loop or eye, or otherwise so arranged that a hook, *d*, on the end of the hoisting-rope *e* can be readily secured to it. This rope extends over a sheave, *f*, suspended from a suitable hook, *g*, which is fastened to a beam, *h*, at the top of the barn, and thence down under a pulley, *i*, fastened in the floor of the barn, and its end is secured to the capstan D.

The operation is as follows: A wagon loaded with hay or other material is driven into the barn, in front of the tilting platform G, the hoisting-rope *e* is drawn through under the frame F and attached to the platform, and by turning the capstan D said frame, together with the load, is raised, and the platform is gradually brought to a position shown in red outlines in Fig. 2, causing the load to slide down and to drop into the loft to which the same is to be elevated. In order to prevent the frame F dropping off with the load, it is provided with two loops, *j*, at its under side, through which the hoisting-rope passes, and for the sake of additional safety said frame may be tied to the corners of the tilting platform previous to starting the capstan. In practice the platform will be so arranged that it can be readily shifted to different positions, in order to dump different loads at different spots in the loft.

This apparatus is particularly intended for the purpose of elevating hay, but it is obvious that it can be used for elevating coal or any other article or material. If used for elevating coal or other similar articles, the frame F has to be replaced by a box capable of holding the load.

What I claim as new, and desire to secure by Letters Patent, is—

The tilting platform G, applied in combination with a frame or box, F, and with a suitable hoisting rope and tackle, substantially in the manner and for the purpose shown and described.

G. W. PROUT.

Witnesses:
P. T. DODGE,
C. L. BERRY.